US010465640B1

(12) United States Patent
Wolgamott

(10) Patent No.: US 10,465,640 B1
(45) Date of Patent: Nov. 5, 2019

(54) ACTIVE COLD AIR INTAKE SYSTEM

(71) Applicant: Supertrapp Industries, Inc., Cleveland, OH (US)

(72) Inventor: Nikolas James Wolgamott, Grand Ledge, MI (US)

(73) Assignee: SUPERTRAP INDUSTRIES, INC, Cleveland, OH (US)

( * ) Notice: Subject to any disclaimer, the term of this patent is extended or adjusted under 35 U.S.C. 154(b) by 0 days.

(21) Appl. No.: 16/174,319

(22) Filed: Oct. 30, 2018

Related U.S. Application Data

(60) Provisional application No. 62/579,323, filed on Oct. 31, 2017.

(51) Int. Cl.
*F02M 35/16* (2006.01)
*F02D 41/18* (2006.01)
*F02M 35/10* (2006.01)
*F02M 35/12* (2006.01)

(52) U.S. Cl.
CPC ......... *F02M 35/161* (2013.01); *F02D 41/182* (2013.01); *F02M 35/10386* (2013.01); *F02M 35/1222* (2013.01)

(58) Field of Classification Search
CPC ... F02M 35/161–164; F02M 35/10386; F02M 35/1222; F02M 35/1227; F02M 35/10373; F02M 35/1038
See application file for complete search history.

(56) References Cited

U.S. PATENT DOCUMENTS 6,423,108 B1 * 7/2002 Mueller ................. F02M 35/08 123/198 E
8,807,113 B2 * 8/2014 Cassell, Jr. .......... F02M 35/161 123/198 E
9,062,639 B1 * 6/2015 MacKenzie .......... F02M 35/161
9,115,658 B2 * 8/2015 Glugla .................... F02D 37/02
9,404,453 B2 * 8/2016 Pursifull .......... F02M 35/10118
9,528,476 B2 * 12/2016 Surnilla ........... F02M 35/10373
9,574,509 B2 * 2/2017 Uhrich ................ F02D 41/0077
9,644,581 B2 * 5/2017 Jung ................ F02M 35/10091
9,677,517 B2 * 6/2017 Roten .................. F02M 35/161
10,137,753 B2 * 11/2018 Schaake ............. B60H 1/00021
10,280,879 B2 * 5/2019 Stempien ............. F02M 35/088
10,323,605 B2 * 6/2019 Miller ..................... F02B 47/02
10,330,034 B2 * 6/2019 Brewbaker ......... F02D 41/0072
(Continued)

*Primary Examiner* — Erez Gurari
(74) *Attorney, Agent, or Firm* — Gugliotta & Gugliotta LPA

(57) ABSTRACT

A cold air intake system is provided for actively controlling airflow based upon user input and/or demand conditions. Two air inlets are provided into a sealed air box with the secondary air intake including an air control valve for modulating intrusion of intake air. The valve has a valve seat formed the housing sidewall and a flap door valve member actively actuated via a controller. The mass air flow sensor indicates total demand. A pressure sensor and a temperature sensor provide additional input from the airbox. The controller modifies the valve position based upon pressure, temperature and mass air flow. Control is biased to increase secondary air intake when airbox pressure decreases and biased to decrease secondary air intake when airbox temperature increases. Controller biasing occurs between 30° F. to 160° F. and over pressure ranges between 0.01" $H_2O$ to 5" $H_2O$.

20 Claims, 3 Drawing Sheets

(56) References Cited

U.S. PATENT DOCUMENTS

2002/0083916 A1* 7/2002 Maurer ............ F02M 35/10013 123/198 E
2003/0221905 A1* 12/2003 Xia ........................ B60K 11/04 181/224
2006/0006011 A1* 1/2006 Khouw .................. B60K 13/02 180/68.3
2007/0295553 A1* 12/2007 Ochi ...................... F02M 27/08 181/18
2010/0083928 A1* 4/2010 Saito ...................... F02M 35/02 123/184.56
2013/0124068 A1* 5/2013 Kothandaraman ..... F02D 41/18 701/104

* cited by examiner 20
60
80
72
48
70
50
74
40
90

ACTIVE COLD AIR INTAKE SYSTEM

RELATED APPLICATIONS

The present invention claims benefit of U.S. Provisional Application 62/579,323, filed on 31 Oct. 2017 and incorporated by reference as if fully rewritten herein.

BACKGROUND OF THE INVENTION

1. Field of the Invention

The present invention relates generally to air induction systems for internal combustion engines and, more particularly, to a cold air intake system having an actively controlled airflow based upon user input and/or demand conditions.

2. Description of the Related Art

Air intake assemblies are provided on vehicles to deliver air to an internal combustion engine. Commonly the air intake assembly is arranged in an engine compartment and includes an air intake for collecting intake are located behind the radiator grill or in an area within a fender, an air intake duct which communicates the air to an air cleaner enclosure where it is filtered, and then to an intake manifold which direct the filtered air into the combustion chambers.

In order to produce sufficient power at optimal efficiency, the ratio of air to fuel is controlled at an appropriate mass balance. While the delivery of fuel can be routinely, adequately and repeatably be delivered, delivery of air is more problematic due to its compressible flow. For example, changes in air temperature or restrictions in airflow through the intake system can both cause detrimental performance. As such, in addition to normal ranges and changes in atmospheric temperature, the mere increase in the temperature of the engine compartment due to the operation of the engine can diminish the mass flow of air to the engine if not accommodated. As the temperature of the intake air increases, a reduction in engine power and fuel economy occurs.

Some methods and devices are known that incorporate various mechanisms for improving the delivery and flow modulation of air for improvement of engine performance. For example:

U.S. Pat. No. 9,677,517, issued in the name of Roten et al., discloses a dual path cool air inlet system having a primary and secondary air intake ducts to an air cleaner enclosure unit. Air is directed to the air cleaner enclosure from the air ducts based upon pressure in each duct. A fan in one duct boost airflow, and a baffle within the duct is used to modulate airflow from the fan.

U.S. Pat. No. 6,382,161, issued in the name of Alex et al., discloses an air induction system for internal combustion engines having a primary induction tube, and a secondary induction tube. The secondary induction tube has a closing element in the form of a rotary flap that is actuated depending upon engine speed. The single claim includes limitations specific to the geometry of an integrated air filter housing, and the objective is the optimum suppression of noise.

U.S. Pat. No. 7,401,590, assigned to the Harley-Davidson Motor Company, discloses an active air intake for a motorcycle engine. An air filter box is provided with two openings and a valve for opening-closing the second opening. However, the openings are in series, not parallel, and the baffle valve is behind the filter not before. Of interest is that the vale is electronically actuated and controlled from the ECM based upon engine speed, throttle position and gear selection.

U.S. Pat. No. 8,137,425, assigned to Toyota, discloses an intake system that has two air intake ducts connected to the air cleaner box. The first air intake is farther from the air box and has a larger cross sectional area than the second air intake. The centerline of each intake intersects at the middle of the air box. An on/off valve at the second air intake is actuated based on negative pressure.

U.S. Pat. No. 6,209,503, issued in the name of Komada et al., discloses an air intake duct also having a pair of intake ducts that are balanced to reducing intake noise at low engine speeds. This extensive patent uses a variety of mechanical balancing mechanisms in order to provide the use of the ECM, or any electronic valving.

U.S. Pat. No. 6,423,108, issued in the name of Mueller, discloses an air filter housing having two intakes ducts, each with an independent closure valve. When temperatures of intake air fall below a set point the first intake valve closes and the second intake valve opens in order to provide an alternate air intake flow path in order to minimize the intrusion of unencumbered snow that can cause engine stalling. here are various other patents with 'snow dumping' valves and operations for addressing similar issues of snow/moisture intrusion, including U.S. Pat. Nos. 8,048,197 and 9,062,639, which generally control airflow through alternate paths, with minimal pressure drop, based upon temperature changes.

U.S. Pat. No. 7,198,036, issued in the name of White, discloses a system and method for cooling air intake that utilizes compressed air injection to cool the air directed into the intake of the engine.

And, U.S. Pat. No. 4,538,556, issued in the name of Takeda, has an air intake device that has a bypass tank that allows for both additional air intrusion to be provided to the engine at high speeds as well as provides for decreased intake noise at idle.

As shown, much of the prior art is directed toward amelioration of noise caused when modulating air intake, while others deal with prevention of snow/moisture intrusion, while others still deal with simply minimizing air flow restrictions without consideration of the intended demand. Thus, while these various cold air intake systems work for their intended purpose, there remains a need for improvement in the relevant art.

Consequently, a need exists for an actively controlled cold air intake system.

SUMMARY OF THE INVENTION

It is thus an object of the present invention to provide an improved air induction system for internal combustion engines.

It is a feature of the present invention to provide a cold air intake system having an actively controlled airflow based upon user input and/or demand conditions.

The present invention provides an active cold air intake system that includes a cold air box that actively modulates cold air intake from separate sources with minimum pressure drop. The cold air box includes an inlet valve that is modulated by an actuator. A controller biases the valve based upon intake temperature, air mass flowrate and airbox pressure according to a control scheme identified by a user selection mode for efficiency (biased toward temperature control) or performance (biased toward pressure/mass control). Based on variations in combustion need, namely, lower temperature air at low idle and higher air mass throughput at load, a modulation set point for air flow is modified for air flow control separate and distinct from throttle control or air/fuel mixture control.

Through such operation of the airbox damper door improved efficiency and performance can be achieved, with more cool air and less pressure drop being achieved over the entire performance curve.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
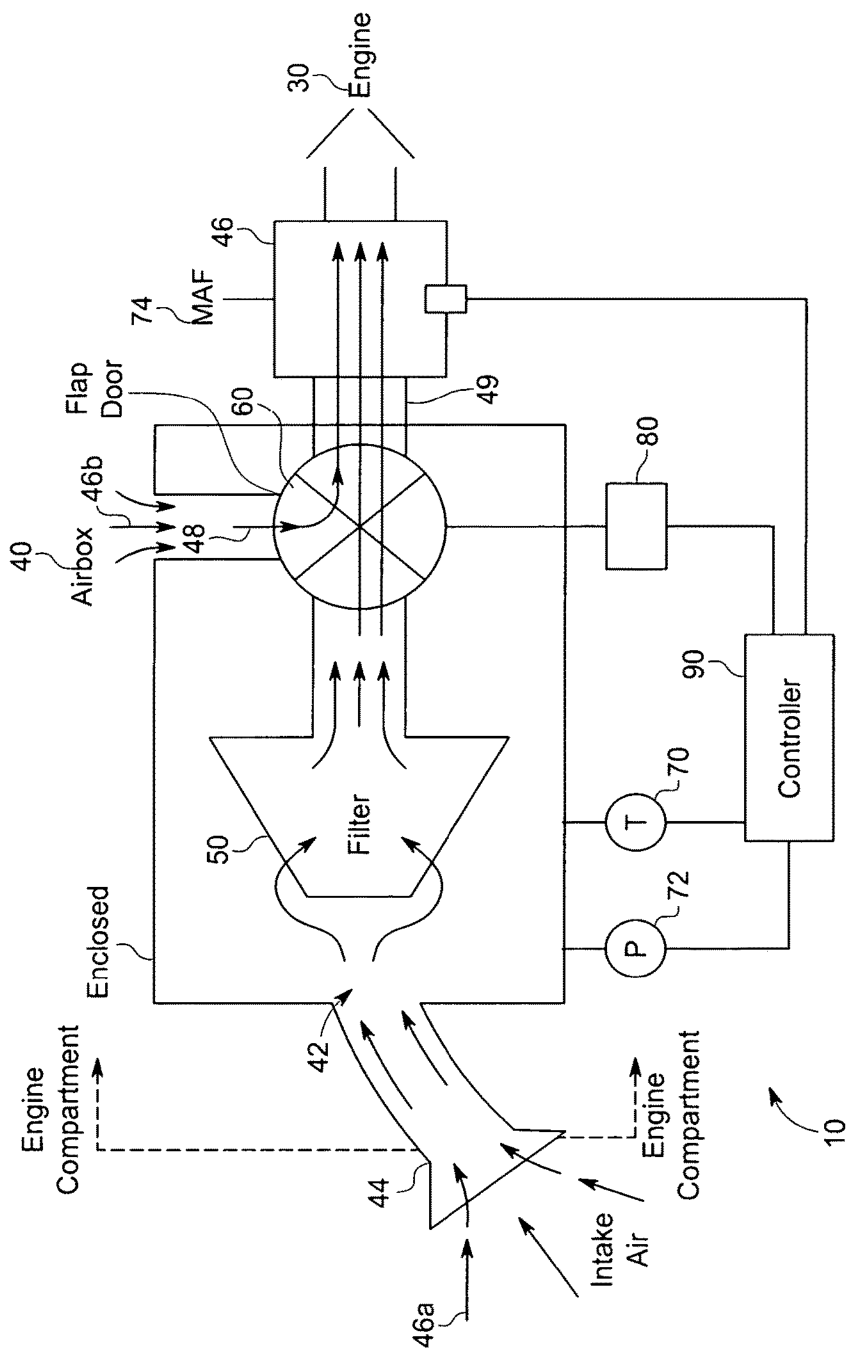
FIG. 1 is a schematic view of a cold air intake system according to the preferred embodiment of the present invention.
Figure 2:
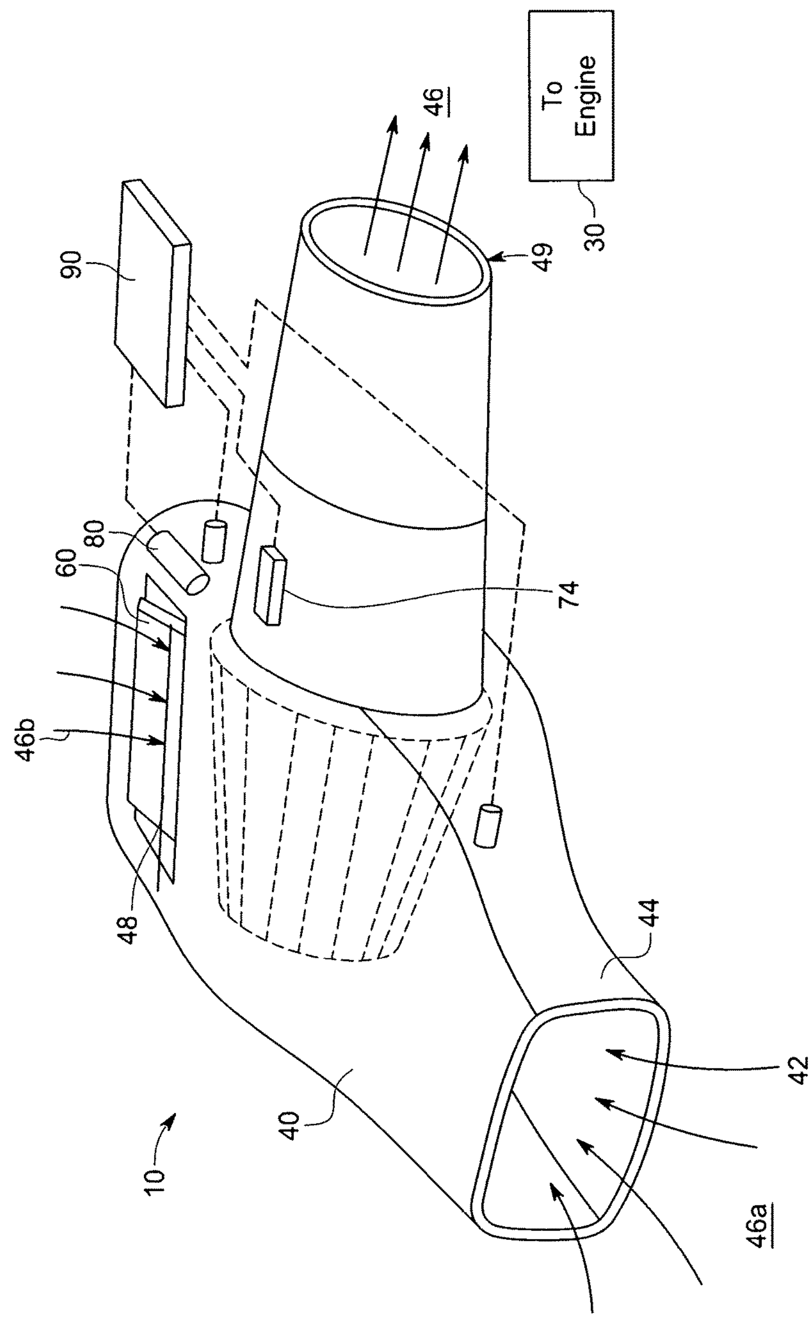
FIG. 2 is a perspective view of an exemplary cold air intake system kit utilizing the present invention.
Figure 3:
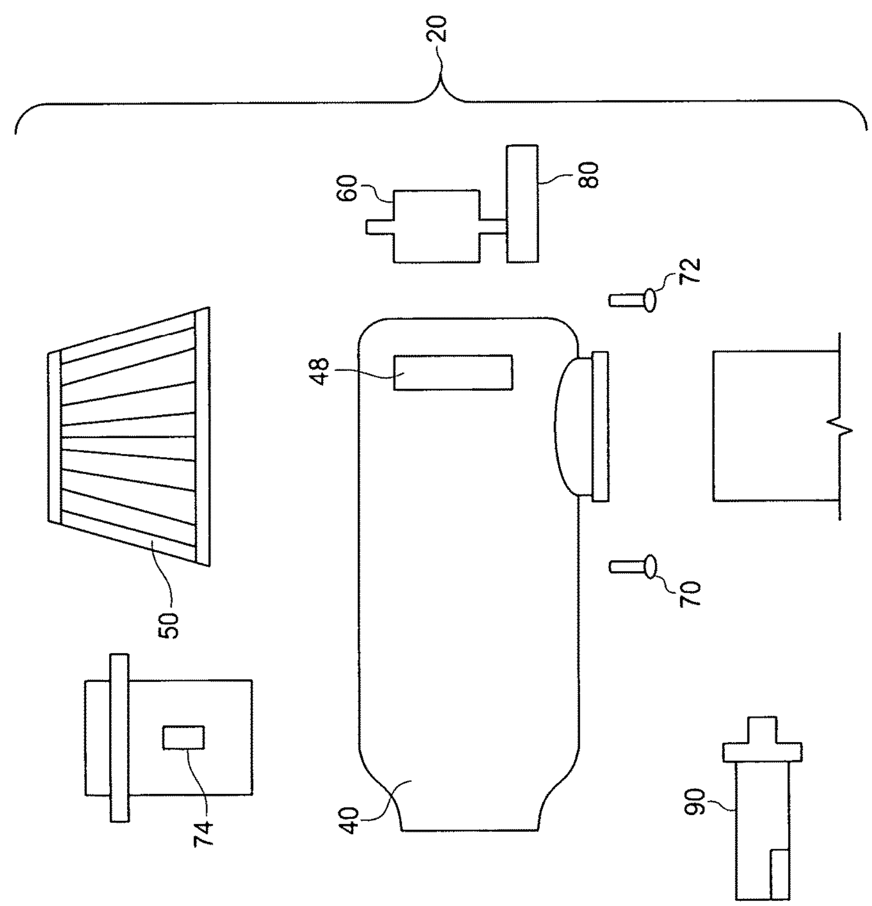
FIG. 3 is an exploded view of the kit of FIG. 2.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, a cold air intake system, generally noted as 10, is shown according to the preferred embodiment of the present invention. The system 10 is intended to be provided as an aftermarket replacement kit 20 for installation on and use with an existing vehicle engine 30. However, is will become apparent to a person having ordinary skill in the relevant art, in light of the present teachings, that the features and improvements herein may be equivalently provided in various installations, including as an original equipment installation.

The kit 20 includes essentially an enclosed airbox 40, air filter 50, air flow control valve 60, sensors including a temperature sensor 70, pressure sensor 72 and mass airflow sensor 74, a control valve actuator 80, and a controller 90.

The airbox 40 forms an enclosed housing having a primary access orifice 42 for proving combustion air input from an intake tube 44. The intake tube 40 allows for the primary intrusion of intake air 46 from outside the vehicle's engine compartment. The intake air 46*a* from outside the engine compartment is intended as being of atmospheric conditions, and as such will pass through the system 10 without significant temperature gain from the conditions within the engine compartment. However, delivery of this intake air flows a distance through the intake tube 44 and, as such, will experience a pressure loss due to the flow of compressible fluid. The airbox 40 further forms a secondary access orifice 48 for secondary intrusion of intake air 46*b* from inside the engine compartment. The intake air 46*b* from inside the engine compartment may be warmer than atmospheric conditions due to increased temperatures within the engine compartment. However, the secondary access orifice 48 is intended to be adapted to delivers such warmer air into the system 10 with significantly less pressure drop.

The enclosed airbox 40 is intended to house the filter 50. Further the air flow control valve 60 provides operational control of secondary intake air 46*b* through the secondary access orifice 48. While the particular configuration of the control valve 60 need not be limiting to provide for the present teachings, by way of example and not meant as a limitation the control valve 60 may comprise an door vane modulated within the airbox housing wall and rotated by the actuator 80. While various configurations may be envisioned, such a structure provides for simplicity of operation while maintaining the intended intake of secondary air 46*b* with very low pressure drop through flow restrictions.

The airbox 40 further has an egress orifice 49 for delivery of air to the engine 30. Egress air is formed of a combination of intake air from outside the engine compartment 46*a* and inside the engine compartment 46*b*. The combined intake air 46 is thereby delivered to the engine 30 through the mass air flow sensor 74.

It should be noted that the above embodiment is provided and described for providing an understanding of the operation of the present invention, as will be further detail below. It is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

2. Operation of the Preferred Embodiment

In operation the control valve actuator 80 is operative connected to the controller 90. The control algorithm provided by the controller 90 optimizes airflow 46 as measured by the mass airflow sensor 74. Additional control inputs include airbox temperature from the temperature sensor 70, and airbox pressure from the pressure sensor 72. Intake air temperatures may range from between approximately 30° F. to approximately 160° F. Further, airbox pressures may range from about 0.01" $H_2O$ to about 5" $H_2O$. As the controller 90 identifies hotter intake temperatures, the valve 60 will modulate closed until higher flow restriction is reached in the airbox (as evidence by increased pressures). Cooler temperatures will allow the control valve 60 it to open wider and/or sooner. Additionally, increased engine demand as evidenced by measured airflow will also drive the opening of the valve 60.

Such a dual control of air through the airbox damper door provides improved efficiency and performance over the entire performance curve. High demand conditions controls to minimize pressure drop. This provides improved performance at high speeds. Improved idle speed performance is provided by tempering engine compartment ambient temperature when increased pressure drops are not present.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical,* 520 US 17 (1997) or *Festo Corp. v. Shoketsu Kinzoku Kogyo Kabushiki Co.,* 535 U.S. 722 (2002), or other similar caselaw or subsequent precedent should not be made if any future claims are added or amended subsequent to this Patent Application.

What is claimed is:

1. In a cold air intake system having an air box in fluid communication with an engine throttle through a mass air flow sensor, wherein the improvement comprises:

a first air intake for channeling intake air from outside a vehicle engine compartment into the air box; and a second air intake for channeling intake air from inside a vehicle engine compartment into the air box, said second air intake communicating air to the air box at a lower pressure drop than said first air intake;

means for actively modulating said second air intake to control a flow of air.

2. In the cold air intake system of claim 1, wherein said means for actively modulating said second air intake comprises an actuated modulation valve incorporated directly within a housing of said airbox.

3. In the cold air intake system of claim 2, wherein the improvement further comprises:

a controller in operation communication with an actuator for modulating said valve;

wherein said controller obtains an air flow demand operating input from said mass air flow sensor for determining a position for said modulation valve.

4. In the cold air intake system of claim 3, wherein the improvement further comprises:

a pressure measurement device in sensory communication with said air box for communicating a pressure within said air box and communicating said pressure to said controller;

a temperature measuring device in sensory communication with said air box for measuring a temperature within said air box and communicating said temperature to said controller;

wherein said controller provides a modified position for said modulation valve based upon said pressure and said temperature.

5. In the cold air intake system of claim 4, wherein said modified position is biased toward being further opened or faster opened when said pressure decreases.

6. In the cold air intake system of claim 4, wherein said modified position is biased toward being further closed or faster closed when said temperature increases.

7. In the cold air intake system of claim 5, wherein said modified position is biased toward being further closed or faster closed when said temperature increases.

8. In the cold air intake system of claim 7, wherein said temperature ranges from between approximately 30° F. to approximately 160° F.

9. In the cold air intake system of claim 8, wherein said pressure ranges from between approximately 0.01" $H_2O$ to approximately 5" $H_2O$.

10. A cold air intake system comprising:

an enclosed airbox having a housing containing an air filter and forming a primary access orifice, a secondary access orifice and an exit orifice in fluid communication with a vehicle throttle input;

an intake tube adapted for allowing intrusion of intake air substantially from outside a vehicle's engine compartment;

an air control valve for modulating intrusion of intake air through said secondary access orifice substantially from inside a vehicle's engine compartment, said valve further comprising:

a valve port formed by said secondary access orifice;

a valve seat formed a sidewall of said housing;

a valve member mounted across said valve port; and an actuator for controlling a position of said valve member between a sealed condition contacting said valve seat and an open condition allowing fluid communication through said secondary access orifice;

a controller in operational connection with said actuator and in sensory communication with a mass air flow sensor for communicating to said controller a mass air flow through said exit orifice;

a pressure measurement device in sensory communication with said air box for communicating a pressure within said air box and communicating said pressure to said controller; and a temperature measuring device in sensory communication with said air box for measuring a temperature within said air box and communicating said temperature to said controller;

wherein said controller provides a modified position for said modulation valve based upon said pressure and said temperature and said mass air flow.

11. The cold air intake system of claim 10, wherein said intake tube air provides air to said air box at a temperature from between approximately 30° F. to approximately 160° F. and at a pressure form between about 0.01" $H_2O$ to about 5" $H_2O$.

12. The cold air intake system of claim 11, wherein said airbox, said air filter, said intake tube, said air control valve and actuator, said controller, said pressure measurement device and said temperature measuring device further comprise an aftermarket replacement kit for installation on and use with an existing vehicle engine; and said mass air flow sensor is adapted from an original vehicle equipment installation.

13. The cold air intake system of claim 11, wherein said airbox, said air filter, said intake tube, said air control valve and actuator, said controller, said pressure measurement device and said temperature measuring device and said mass air flow sensor further comprise an aftermarket replacement kit for installation on and use with an existing vehicle engine.

14. A method of modifying vehicle performance and efficiency over an entire performance curve comprising:

a. providing a secondary air intake for adding additional air from substantially inside a vehicle engine compartment to mix with intake air from a primary air intake to an airbox;

b. measuring a pressure inside said airbox;

c. measuring a temperature inside said airbox;

d. modulating total mass air flow demand exiting said airbox to a vehicle throttle; and e. biasing an increase in secondary air intake when said pressure decreases.

15. The method of claim 14, further comprising:

d. biasing a decrease in secondary air intake when said temperature increases.

16. The method of claim 14, wherein said increase is biased over a temperature ranges from between approximately 30° F. to approximately 160° F.

17. The method of claim 14, wherein said decrease is biased over pressure ranges from between approximately 0.01" $H_2O$ to approximately 5" $H_2O$.

18. The methods of claim 14, wherein said airbox comprises:

an enclosed housing containing an air filter and forming a primary access orifice, a secondary access orifice and an exit orifice in fluid communication with a vehicle throttle input;

an intake tube adapted for allowing intrusion of intake air substantially from outside a vehicle's engine compartment;

an air control valve for modulating intrusion of intake air through said secondary access orifice substantially from inside a vehicle's engine compartment, said valve further comprising:

a valve port formed by said secondary access orifice;

a valve seat formed a sidewall of said housing;

a valve member mounted across said valve port; and an actuator for controlling a position of said valve member between a sealed condition contacting said valve seat and an open condition allowing fluid communication through said secondary access orifice;

a controller in operational connection with said actuator and in sensory communication with a mass air flow sensor for communicating to said controller a mass air flow through said exit orifice.

19. The method of claim 18, wherein said airbox, said air filter, said intake tube, said air control valve and actuator, said controller, a pressure measurement device and a temperature measuring device further comprise an aftermarket replacement kit for installation on and use with an existing vehicle engine; and a mass air flow sensor is adapted from an original vehicle equipment installation.

20. The method of claim 18, wherein said airbox, said air filter, said intake tube, said air control valve and actuator, said controller, a pressure measurement device and a temperature measuring device and a mass air flow sensor further comprise an aftermarket replacement kit for installation on and use with an existing vehicle engine.

* * * * *